US011110524B2

(12) United States Patent
Fang et al.

(10) Patent No.: US 11,110,524 B2
(45) Date of Patent: Sep. 7, 2021

(54) ROTARY CUTTING TOOL WITH INTERNAL COOLANT PASSAGE

(71) Applicant: Kennametal Inc., Latrobe, PA (US)

(72) Inventors: Xiangdong D. Fang, Greensburg, PA (US); Ruy Frota De Souza Filho, Latrobe, PA (US); David J. Wills, Greensburg, PA (US); Joe G. Slusarcyk, Derry, PA (US); Manuel Wacinski, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/294,986

(22) Filed: Mar. 7, 2019

(65) Prior Publication Data
US 2020/0282475 A1    Sep. 10, 2020

(51) Int. Cl.
  *B23B 51/06*    (2006.01)
  *B23B 51/02*    (2006.01)
  *B33Y 80/00*    (2015.01)

(52) U.S. Cl.
  CPC .............. *B23B 51/06* (2013.01); *B23B 51/02* (2013.01); *B33Y 80/00* (2014.12); *B23B 2251/40* (2013.01); *B23B 2251/50* (2013.01)

(58) Field of Classification Search
  CPC ................ B23B 2240/00; B23B 51/06; B23B 2260/126
  See application file for complete search history.

(56) References Cited

U.S. PATENT DOCUMENTS

| 3,893,353 A  * | 7/1975 | Lahmeyer ............... B23B 51/06 76/108.6 |
| 7,207,755 B2 * | 4/2007 | Berglow .................. B23C 5/10 407/11 |
| 7,226,254 B2 * | 6/2007 | Friedrichs ............. B23B 31/005 408/226 |
| 7,273,331 B2 * | 9/2007 | Giannetti ................ B23B 27/10 407/108 |
| 7,476,067 B2   | 1/2009 | Borschert et al. |

(Continued)

FOREIGN PATENT DOCUMENTS

| DE | 102014108220 A1 * | 12/2015 | ............. B23B 51/06 |
| DE | 102014013210 A1 * |  3/2016 | ............. B23B 51/06 |
| GB |      1378899 A  * | 12/1974 | ............. B23B 51/06 |

OTHER PUBLICATIONS

English translation of DE 10 2014 013 210 (Year: 2015).*
English translation of DE 10 2014 108 220 (Year: 2015).*

*Primary Examiner* — Alan Snyder
(74) *Attorney, Agent, or Firm* — Larry R. Meenan (57) ABSTRACT

A rotary cutting tool includes a replaceable cutting insert, a pocket portion for holding the cutting insert, and a chip flute portion having a plurality of helical flutes. An internal coolant passage is formed in the chip flute portion and has both a twisted geometry and a "see-through" central portion. The internal coolant passage is polygonal in cross-sectional shape having a number of cusps equal to the number of flutes. The internal coolant passage greatly increases coolant flow area, while maintaining the stiffness and rigidity of the cutting tool. A method includes forming the internal coolant passage using additive manufacturing such that the internal coolant passage has a "see-through" central portion and a twisted geometry.

13 Claims, 11 Drawing Sheets

(56) References Cited

U.S. PATENT DOCUMENTS

| | | |
|---|---|---|
| 8,882,412 B2 | 11/2014 | Sampath |
| 8,946,585 B2 | 2/2015 | Kappmeyer |
| 9,302,332 B2 * | 4/2016 | Scanlon ................. B23B 51/06 |
| 9,975,182 B2 * | 5/2018 | Stoyanov ................ B23B 27/14 |
| 2012/0308319 A1 | 12/2012 | Sampath et al. |
| 2014/0321931 A1 | 10/2014 | Gey |
| 2015/0298221 A1 | 10/2015 | Ach et al. |
| 2016/0001381 A1 | 1/2016 | Lach |

* cited by examiner

ROTARY CUTTING TOOL WITH INTERNAL COOLANT PASSAGE

BACKGROUND OF THE INVENTION

Figure 31:
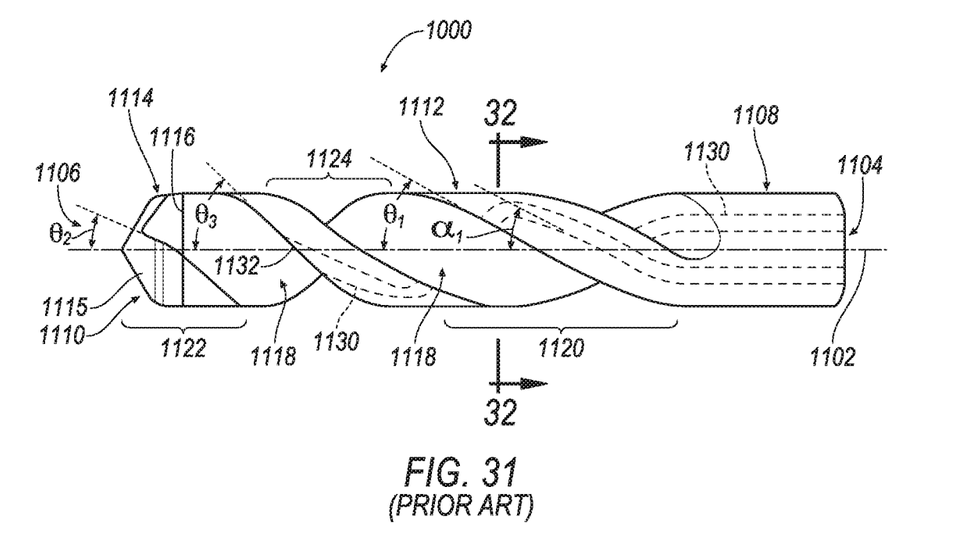
FIG. 31 is a side view of a conventional rotary cutting tool.
Figure 32:
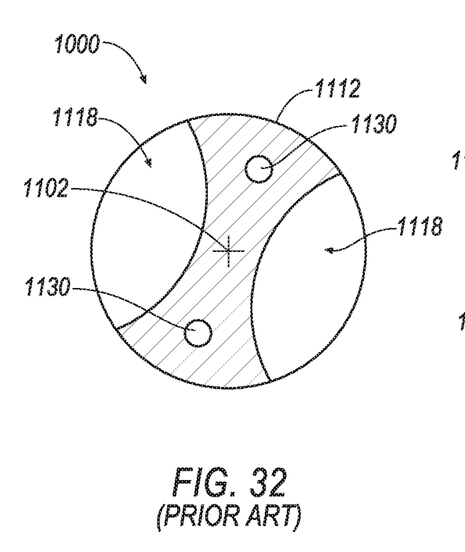
FIG. 32 is a cross-sectional view of the convention cutting tool of FIG. 31 taken along line 32-32 of FIG. 31.
Figure 33:
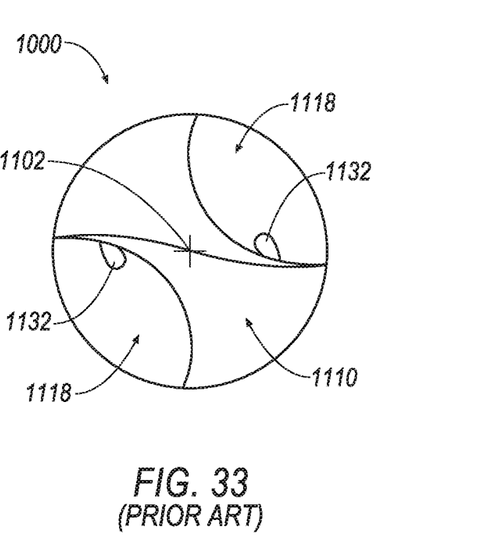
FIG. 33 is an end view of the conventional cutting tool of FIG. 31 looking down the longitudinal axis of the cutting tool toward the second end.

Some industries, such as the aerospace industry, typically require small-diameter rotary cutting tools, such as drills, and the like. FIGS. 31-33 depict a conventional rotary cutting tool 1000, such as a drill, for conducting cutting operations on a workpiece (not shown) when the cutting tool 1000 is rotated about a central longitudinal axis 1102. The cutting tool 1000 includes a first end 1104 and an opposite second end 1106. The cutting tool 1000 further includes a mounting portion 1108 disposed at or about first end 1104 for mounting the cutting tool 1000 in a chuck mechanism of a machine tool (not shown), a cutting tip 1110 disposed generally at the second end 1106 for engaging and cutting a workpiece (not shown), and a body portion 1112 of generally cylindrical shape disposed between the mounting portion 1108 and the cutting tip 1110. The cutting tip 1110 is generally formed from a carbide 1114 or a PCD insert 1115. Preferably, the body portion 1112 is formed from a steel material.

The cutting tool 1000 further includes two flutes 1118 provided in the body portion 1112. Each flute 1118 includes a first portion (shown generally at 1120), and a transition portion (shown generally at 1124) disposed between the first portion 1120 and the second portion 1122. The first portion 1120 of each flute 1118 is disposed generally at a first helix angle $\theta_1$ relative to the central longitudinal axis 1102, the second portion 1122 of each flute 1118 is disposed at a second helix angle $\theta_2$ relative the central longitudinal axis 1102, and the transition portion 1124 of each flute 1118 is disposed at a third helix angle $\theta_3$ relative to the central longitudinal axis 1102. Preferably, the first helix angle $\theta_1$ is at or about 30 degrees (+/−2 degrees), the second helix angle $\theta_2$ is in the range of about 15 degrees to about 20 degrees, and the transition helix angle $\theta_3$ is at or about 45 degrees (+/−2 degrees). In any case, the third helix angle $\theta_3$ is greater than the first helix angle $\theta_1$, the desirability of such relationship is discussed in further detail below.

As shown in hidden line in FIG. 31, the cutting tool 1000 further includes two coolant passages 130 defined in the generally cylindrical body 1112. Each coolant passage 1130 is disposed at a helix angle, $\alpha_1$, relative to the central longitudinal axis. Preferably, the helix angle, $\alpha_1$, of the coolant passages 1130 is at or about the same angle as the first helix angle, $\theta_1$, of the flutes 1118. It is to be readily appreciated that such arrangement provides for each coolant passage 1130 to run generally parallel alongside the first portion 1120 of a respective flute 1118.

As shown in FIGS. 31 and 33, each coolant passage 1130 comprises an opening 1132 disposed generally in or about the transition portion 1124 of a corresponding flute 1118. In other words, as a result of the difference between the first helix angle, $\theta_1$, of the first portion 1120 of each flute (and the helix angle, $\alpha_1$, of the coolant passages 1130) and the transition angle, $\theta_3$, of the transition portion 1124, each coolant passage 1130 breaks out of the drill body 1112 generally in or near the transition portion 1124, thus providing coolant to the periphery (not numbered) and the cutting tip 1110 of the cutting tool 1000 without requiring any EDM processing of the cutting tool 1000.

Although the cutting tool 1000 provides adequate coolant in most applications, the common difficulty for cutting tools having small cutting diameters, such as drills, and the like, is whether sufficient coolant ($H_2O$, $CO_2$, $LN_2$, and the like) can be supplied to improve the machining process, in particular in machining difficult to cut materials, such as titanium and the like.

For smaller diameter cutting tools with an internal coolant passage, the challenge is: (1) how to design an internal coolant passage that can supply sufficient coolant within a very limited space, and (2) how to manufacture the cutting tool in a cost-effective manner. When manufacturing the smaller diameter cutting tool using 3D printing, another challenge is how to effectively de-powder a 3D printed blank, in particular the very small cross-sectional area and curved (i.e., helical) coolant passages.

SUMMARY OF THE INVENTION

The problem of providing adequate coolant flow in a smaller diameter rotary cutting tool is solved by providing an internal coolant passage having a continuously, twisted or helical geometry with a "see-through" central portion. In other words, the coolant passage rotates along the central, longitudinal axis and follows the spiral or twisted geometry of the flutes, with maintaining a constant wall thickness between the coolant passage and each flute. As the result, the coolant flow through the cutting tool is greatly increased, as compared to conventional cutting tools with circular coolant channels. In addition, the "see-through" central portion greatly simplifies the de-powdering process of the blank when the coolant passage is formed by laser additive manufacturing (i.e., 3D printing), thereby reducing the manufacturing cost.

In one aspect, a rotary cutting tool comprises a cutting insert; a tool body comprising a pocket portion for holding the cutting insert and a chip flute portion having a plurality of helical chip flutes; and a first internal coolant passage formed in the chip flute portion, wherein the first internal coolant passage has a twisted geometry.

In another aspect, a tool body for a rotary cutting tool comprises a pocket portion for holding the cutting insert and a chip flute portion having a plurality of helical chip flutes; and an internal coolant passage formed in the chip flute portion, wherein the internal coolant passage has a "see-through" central portion and a twisted geometry.

In yet another aspect, a method of providing coolant in a rotary cutting tool comprises forming a first internal coolant passage in a chip flute portion such that the first internal coolant passage is helical and has a "see-through" central portion.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a version of a cutting tool, such as an orbital drill, and the like, with both right-handed helical or spiral flutes and left-handed helical or spiral flutes for machining a workpiece (not shown) made of multiple materials. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "helical" is defined as pertaining to or having the form of a helix or spiral. A "helix" or "spiral" is defined as a curve in three-dimensional space formed by a straight line drawn on a plane when that plane is wrapped around a cylindrical surface of any kind, especially a right circular cylinder, as the curve of a screw. A circular helix of radius a and slope b/a (or pitch 2πb) is described by the following parametrization:

$$x(\theta) = a \sin \theta,$$

$$y(\theta) = a \cos \theta,$$

$$z(\theta) = b\theta.$$

As used herein, the phrase "helix angle" is defined as the angle between any helix and an axial line on its right, circular cylinder or cone. The helix angle references the axis of the cylinder, distinguishing it from the lead angle, which references a line perpendicular to the axis. Thus, the helix angle is the geometric complement of the lead angle. The helix angle is measured in degrees.

As used herein, the term "nephroid" is defined as a epicylcloid with two cusps.

As used herein, the term "deltoid," also known as a tricuspoid or Steiner curve, is a hypocycloid of three cusps. In other words, it is the roulette created by a point on the circumference of a circle as it rolls without slipping along the inside of a circle with 3 times or 1.5 times its radius. More broadly, a deltoid can refer to any closed figure with three vertices connected by curves that are concave to the exterior, making the interior points a non-convex set.

As used herein, the term "astroid" is a hypocycloid with four cusps. Specifically, it is the locus of a point on a circle as it rolls inside a fixed circle with four times the radius.

The term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, a "see-through" geometry is defined as a coolant passage geometry that allows a viewer to see entirely through the coolant passage when looking down the first end of the cutting tool along the central, longitudinal axis toward the second end of the cutting tool.

As used herein, the term "number" shall be used to refer to any non-zero quantity (i.e., one or any quantity greater than one).

As used herein, the phrase "small diameter" is defined as a cutting tool with a cutting diameter of 10 mm or less.

As used herein, the term "see-through" is defined as a continuous, uninterrupted line-of-sight along the central, longitudinal axis that allows coolant to flow directly through the chip flute portion of the cutting tool.

As used herein, the helix of a flute can twist in two possible directions, which is known as handedness. Most flutes are oriented so that the cutting tool, when seen from a point of view on the axis through the center of the helix, moves away from the viewer when it is turned in a clockwise direction, and moves towards the viewer when it is turned counterclockwise. This is known as a right-handed (RH) flute geometry, because it follows the right-hand grip rule. Flutes oriented in the opposite direction are known as left-handed (LH).

Figure 1:
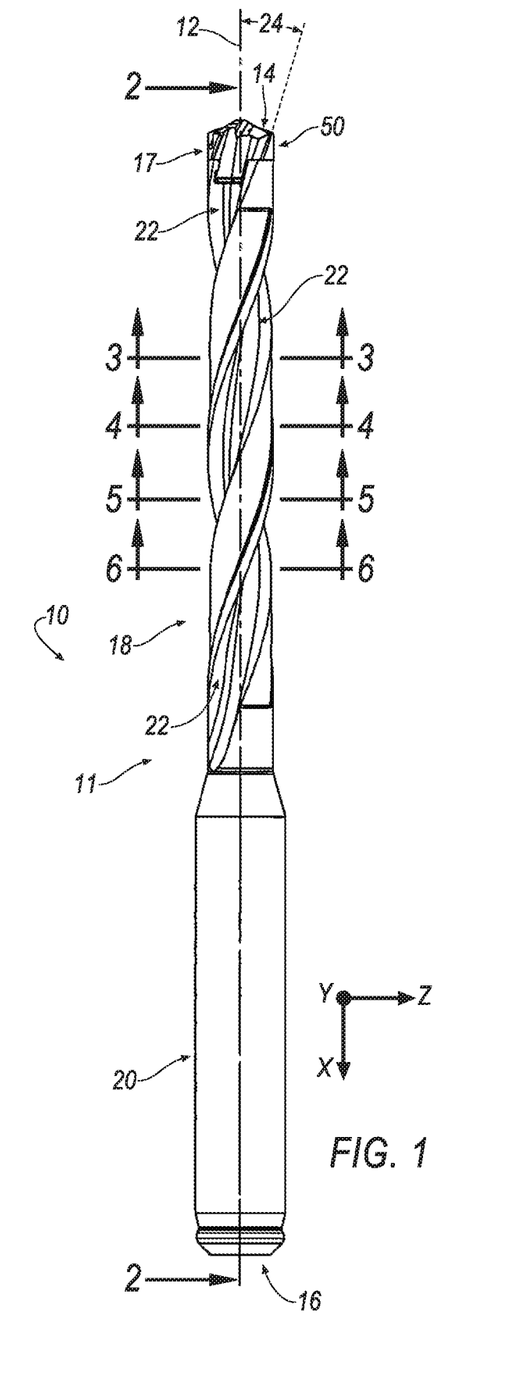
FIG. 1 is a side view of a rotary cutting tool, such as a modular drill with two flutes, according to an embodiment of the invention.
Figure 2:
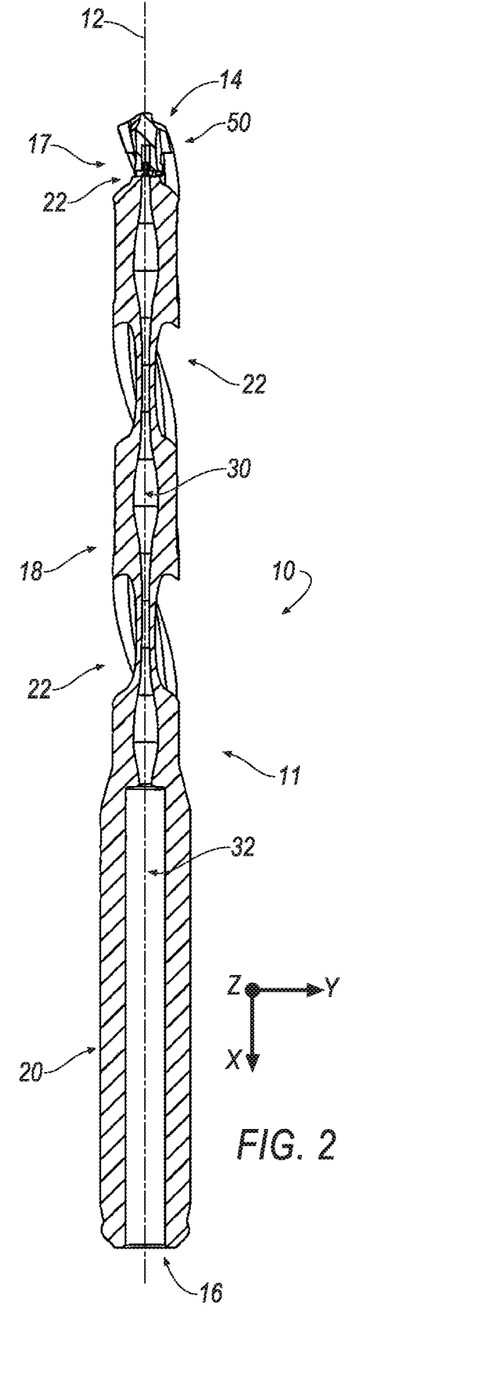
FIG. 2 is a cross-sectional view of the cutting tool of FIG. 1 taken along line 2-2 of FIG. 1.
Figure 3:
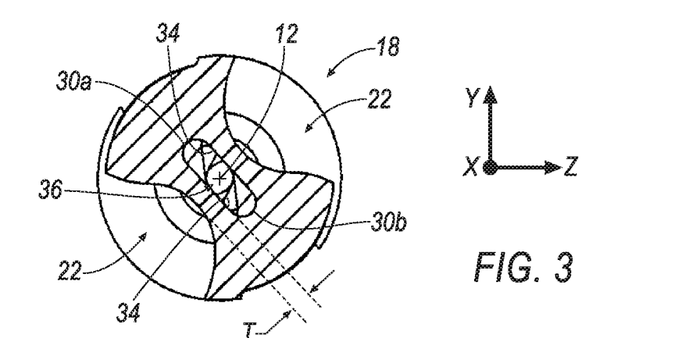
FIG. 3 is a cross-sectional view of the cutting tool of FIG. 1 taken along line 3-3 of FIG. 1.
Figure 4:
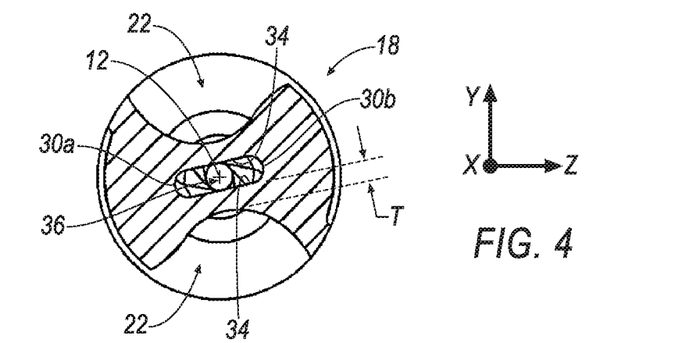
FIG. 4 is a cross-sectional view of the cutting tool of FIG. 1 taken along line 4-4 of FIG. 1.
Figure 5:
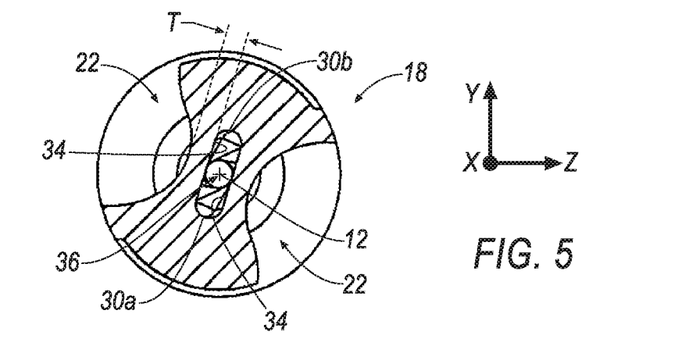
FIG. 5 is a cross-sectional view of the cutting tool of FIG. 1 taken along line 5-5 of FIG. 1.
Figure 6:
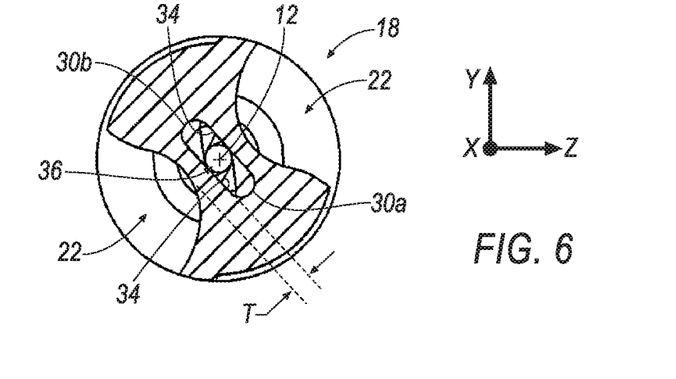
FIG. 6 is a cross-sectional view of the cutting tool of FIG. 1 taken along line 6-6 of FIG. 1.

FIGS. 1 and 2 depict a rotary cutting tool 10 for conducting cutting operations on a workpiece (not shown) when the rotary cutting tool 10 is rotated about a central, longitudinal axis 12 according to an exemplary embodiment of the invention. Although depicted as a modular drill in the exemplary embodiment described herein, it is to be appreciated that the principles of the invention described herein are applicable to other rotary cutting tools, such as, for example, without limitation, a milling tool, a reamer, a tap, an end mill, and the like.

The rotary cutting tool 10 is generally cylindrical and includes a first or forward end 14 and an opposite, second or rear end 16. The rotary cutting tool 10 has a tool body 11 that includes a pocket portion 17 proximate the first end 14 for securely holding a replaceable cutting insert 50, and a chip flute portion 18 with one or more internal coolant passages, as described in more detail below. The tool body 11 also includes a mounting portion 20 proximate the second end 16 for mounting the rotary cutting tool 10 in a chuck mechanism of a machine tool (not shown).

The chip flute portion 18 further includes a plurality of helical chip flutes 22 extending rearwardly from the first end 14 of the chip flute portion 18 to the mounting portion 20. Each chip flute 22 allows chips formed by the rotary cutting tool 10 to exit from the chip flute portion 18 during a cutting operation. Each chip flute 22 has a helical geometry or pattern and are disposed at a helix angle 24 relative to the central, longitudinal axis 12. In one embodiment, for example, the helix angle 24 is at or about 30 degrees (+/−2 degrees). However, it will be appreciated that the invention is not limited by the magnitude of the helix angle 24, and that the invention can be practiced with any desirable helix angle 24 in a range between about greater than 0 degrees and about 75 degrees.

As seen in FIG. 2, the chip flute portion 18 of the rotary cutting tool 10 includes a first internal coolant passage 30 extending entirely through the chip flute portion 18 from the pocket portion 17 to the mounting portion 20 of the rotary cutting tool 10. In addition, the rotary cutting tool 10 further includes a second internal coolant passage 32 extending entirely through the mounting portion 20 from the second end 16 to the chip flute portion 18. Thus, the first and second internal coolant passages 30, 32 allow coolant to pass entirely through the chip flute portion 18 and the mounting portion 20 of the rotary cutting tool 10.

In the illustrated embodiment, the second coolant passage 32 is generally circular in cross-sectional shape and can be in fluid communication with a pressurized coolant source (not shown). Coolant supplied to the rotary cutting tool 10 enters the second coolant passage 32, then enters the first coolant passage 30, and then exits the first end 14 of the rotary cutting tool 10.

One aspect of the invention is that the first coolant passage 30 has a "see-through", twisted geometry that increases coolant flow area, while maintaining stiffness and rigidity of the cutting tool. As a result, the flow rate of coolant through the rotary cutting tool 10 is significantly increased, as compared to conventional cutting tools having a coolant passage with a circular cross-section. In some embodiments, the "see-through", twisted geometry increases the flow rate by at least a factor of three, as compared to coolant flow rates in conventional cutting tools.

Referring now to FIGS. 3-6, the first coolant passage 30 has a polygonal cross-sectional shape with the same number, n, of side walls as the number of flutes 22. In the illustrated embodiment, the first coolant passage 30 is generally rectangular with two rounded end cusps 30a, 30b located between adjacent flutes 22 and two substantially planar side walls 34. In other words, the first coolant passage 30 is generally a nephroid in cross-sectional shape for the rotary cutting tool 10 with two flutes 22. It should be noted that the invention can be practiced with non-rounded cusps. For example, the cusps 30a, 30b can be pointed. In addition, it should also be appreciated that the principles of the invention can be practiced with a rotary cutting tool having any desirable number of flutes 22. For example, the first coolant passage 30 can have a deltoid cross-sectional shape for a cutting tool having three flutes 22 (as discussed below), an astroid cross-sectional shape for a rotary cutting tool having four flutes 22, and the like.

In addition, the first coolant passage 30 extending through the chip flute portion 18 of the cutting tool 10 has a "see-through" central portion 36 when viewed along the central, longitudinal axis 12 of the rotary cutting tool 10. The "see-through" central portion 36 allows a direct line of sight through the entire chip flute portion 18 of the rotary cutting tool 10 when viewed along the central, longitudinal axis 12. As can be realized the "see-through" central portion 36 provides a continuous and uninterrupted path for the flow of coolant directly through the rotary cutting tool 10.

As can be seen in FIGS. 3-6, the first coolant passage 30 increases the flow area for coolant, while maintaining a substantially constant thickness, T, between the first coolant passage 30 and a respective flute 22. As a result, the first coolant passage 30 greatly increases the flow area for coolant provided by the rotary cutting tool 10 without compromising stiffness and rigidity of the rotary cutting tool 10. This aspect of the invention is particularly useful for cutting tools having a small diameter (i.e., a cutting diameter of 6 mm or less).

Figure 7:
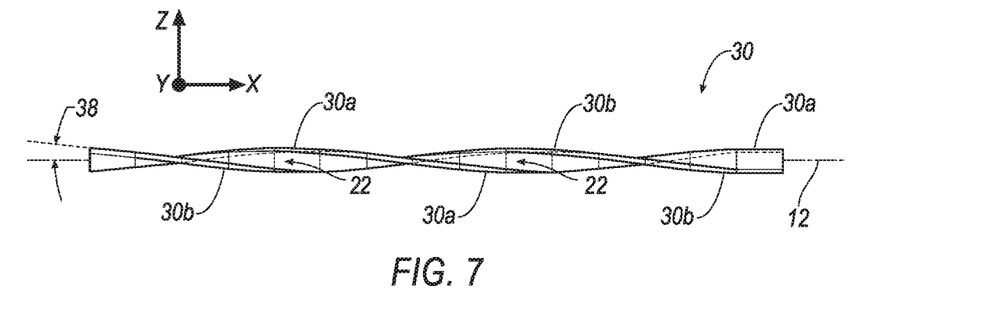
FIG. 7 is a side view of a solid rendering of the first coolant passage showing the twisted geometry of the first coolant passage.
Figure 8:
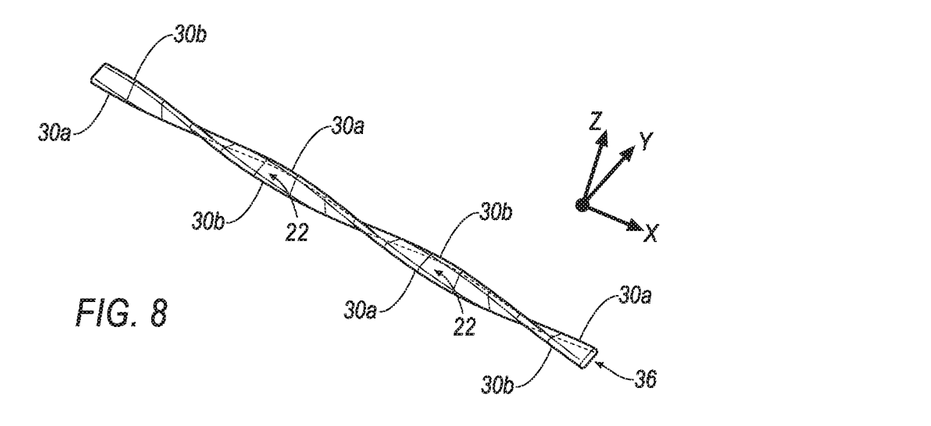
FIG. 8 is a perspective view of the solid rendering of the first coolant passage of FIG. 7 showing the twisted geometry of the first coolant passage.
Figure 9:
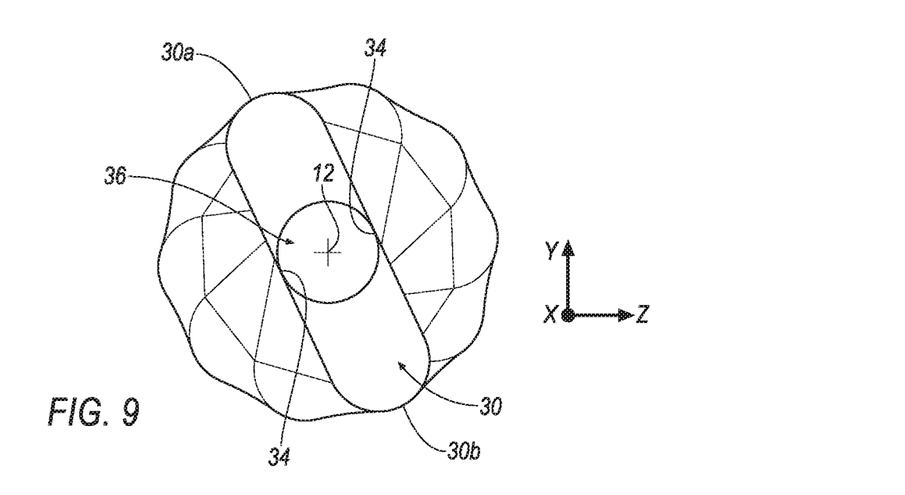
FIG. 9 is an end view of the solid rendering of the first coolant passage of FIG. 7 showing the twisted geometry of the first coolant passage.

FIGS. 7-9 show a solid rendering of the twisted geometry of the first coolant passage 30 of the chip flute portion 18 of the rotary cutting tool 10. As seen in FIGS. 7-9, the first coolant passage 30 has a twisted geometry that follows the pattern or geometry of the helical chip flutes 22. In other words, the first coolant passage 30 twists in the same direction as the helical flutes 22 along the central, longitudinal axis 12 of the cutting tool 10. In the illustrated embodiment, for example, the first coolant passage 30 moves away from the viewer when the cutting tool 10 is turned in a clockwise direction and moves towards the viewer when the cutting tool 10 is turned counterclockwise when viewed along the central, longitudinal axis 12 (i.e., right-hand). It should be noted that the first coolant passage 30 can twist in an opposite direction for a rotary cutting tool having opposite-handed flutes 22. It should also be noted that the invention can be practiced with a rotary cutting tool having straight flutes. In this case, the first coolant passage 30 would follow the straight geometry of the flutes 22.

The first coolant passage 30 is formed with a helix angle 38 with respect to the central, longitudinal axis 12 of the rotary cutting tool 10, as shown in FIG. 8. In one embodiment, the helix angle 38 of the first coolant passage 30 is at or about the same angle as the helix angle 24 of the flutes 22.

Figure 10:
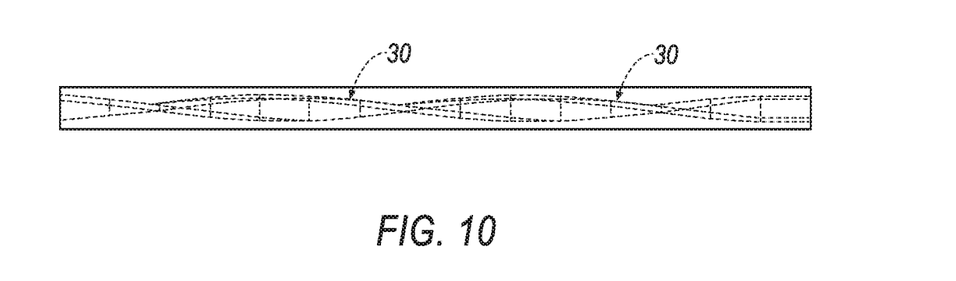
FIG. 10 is a side view of a solid rendering of a simple cylinder with the first coolant passage formed by subtracting the solid rendering of FIGS. 7-9 showing a "see-through" central portion of the helical first coolant passage.
Figure 11:
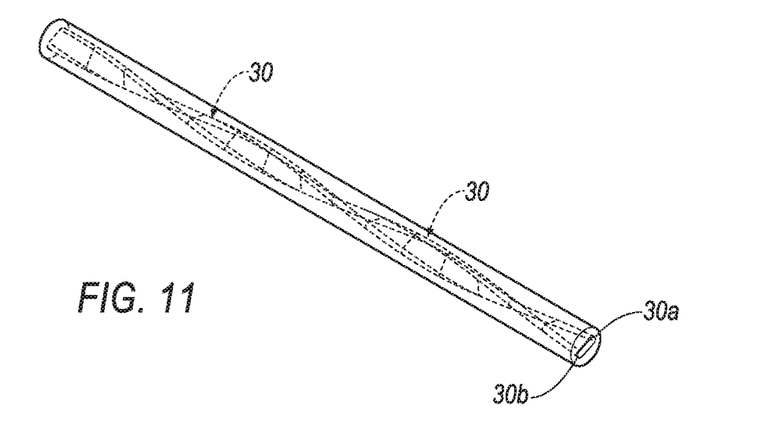
FIG. 11 is a perspective view of the solid rendering of the first coolant passage of FIG. 10 showing a "see-through" central portion of the helical first coolant passage.
Figure 12:
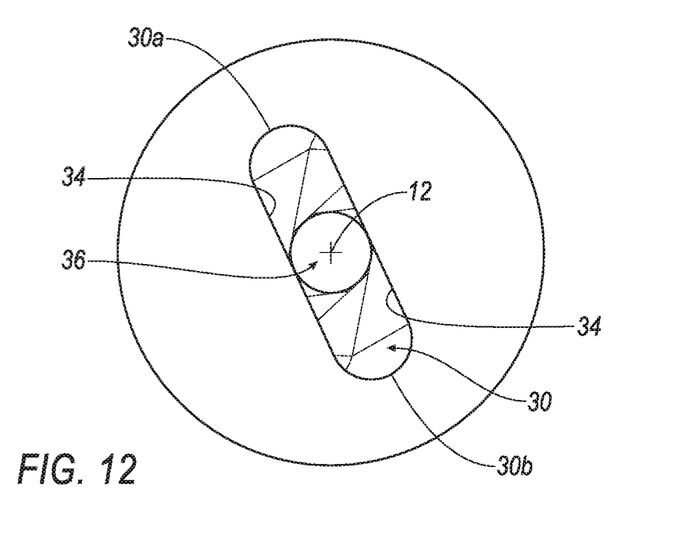
FIG. 12 is an end view of the solid rendering of the first coolant passage of FIG. 10 showing the "see-through" central portion of the first coolant passage.

FIGS. 10-12 show a solid rendering of a simple cylinder with the helical flutes 22 removed for clarity. In FIGS. 10 and 11, the phantom lines are an outline of the first coolant passage 30 formed by subtracting the twisted solid rendering of the first coolant channel 30 shown in FIGS. 7-9. As shown in FIG. 12 the first coolant passage 30 has a twisted geometry and the "see-through" central portion 36.

Figure 13:
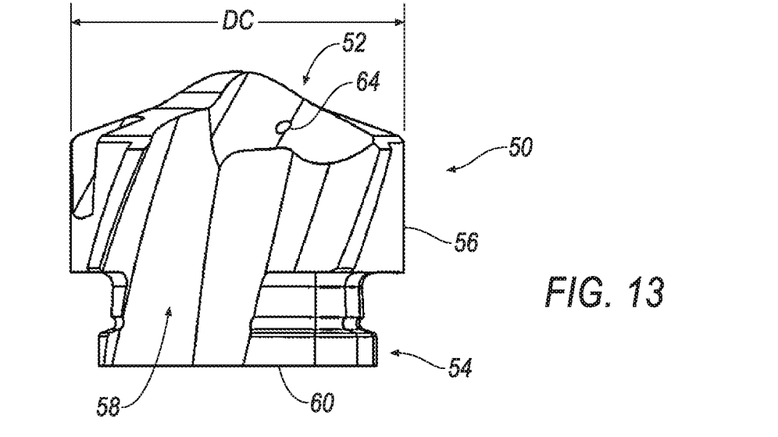
FIG. 13 is a side view of the cutting insert according to an embodiment of the invention.
Figures 14, 15:
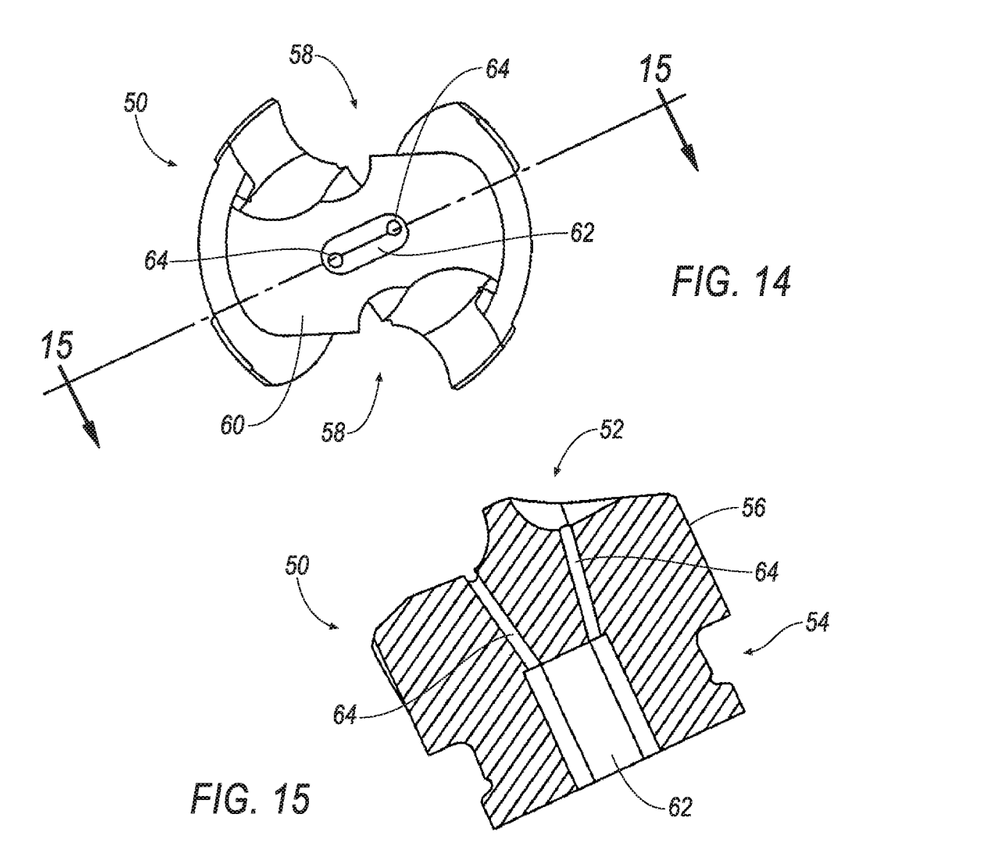
FIG. 14 is a bottom view of the cutting insert of FIG. 13.
FIG. 15 is a cross-sectional view of the cutting insert of FIG. 13 taken along line 15-15 of FIG. 14.

Referring now to FIGS. 13-15, the replaceable cutting insert 50 has a front cutting part 52 and a coupling pin 54 extending axially away from the front cutting part 52 (thus, in an axially rearward direction). The front cutting part 52 of the cutting insert 50 defines a cutting diameter, DC. On its circumference, the cutting insert 50 has an outer peripheral surface 56 that is interrupted by opposite-facing flutes 58 that start in the cutting insert 50 and continuously merge into the helical flutes 22 disposed in the chip flute portion 18. In the exemplary embodiment, the flutes 58 are substantially helical in shape. The coupling pin 54 of the cutting insert 50 extends in the axial rearward direction with respect to the front cutting part 52. The coupling pin 54 is offset in a radially inward direction from the outer peripheral surface 56. The replaceable cutting insert 50 also includes a base surface 60 with a coolant opening 62 in fluid communication with the first coolant passage 30 for providing coolant to the cutting edges of the cutting insert 50. In the illustrated embodiment, the coolant opening 62 has the identical cross-sectional shape as the first coolant channel 30 to provide increased flow rate to the cutting edges, as compared to conventional cutting inserts with a circular cross-sectional shape. The coolant opening 62 is in fluid communication with one or more coolant ducts 64 that extend to the front cutting part 52 of the cutting insert 50. The coolant ducts 64 may have any desirable cross-sectional shape, such as circular, and the like.

Figure 16:
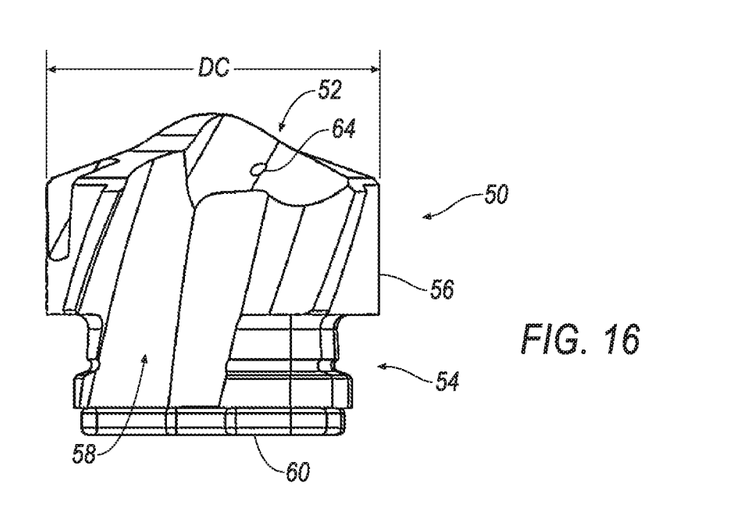
FIG. 16 is a side view of the cutting insert according to another embodiment of the invention.
Figure 17:
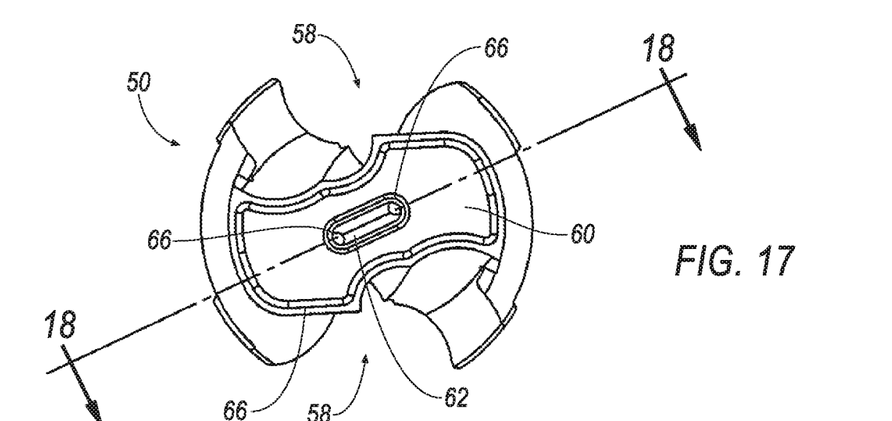
FIG. 17 is a bottom view of the cutting insert of FIG. 16.
Figure 18:
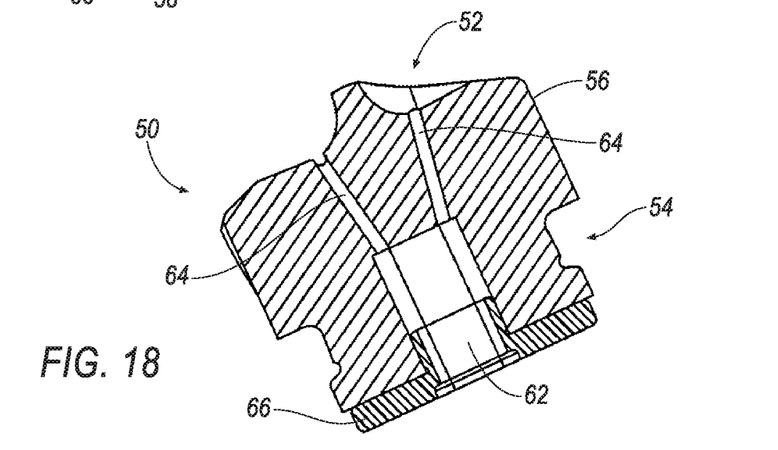
FIG. 18 is a cross-sectional view of the cutting insert of FIG. 16 taken along line 18-18 of FIG. 17.

FIGS. 16-18 shows a cutting insert 50 according to another embodiment of the invention. The cutting insert 50 is identical to the cutting insert 50 shown in FIGS. 13-15, with the addition of a pad 66 around the perimeter of the base surface 60 and the coolant opening 62. The pad 66 provides a seal between the cutting insert 50 and the pocket portion 17 of the cutting tool 10 and may be made of any suitable non-metal material, such as polytetrafluoroethylene (PTFE), and the like.

As mentioned above, the principles of the invention of increasing coolant flow rate, while maintaining stiffness and rigidity can be applied to a rotary cutting tool having any number of flutes.

Figure 19:
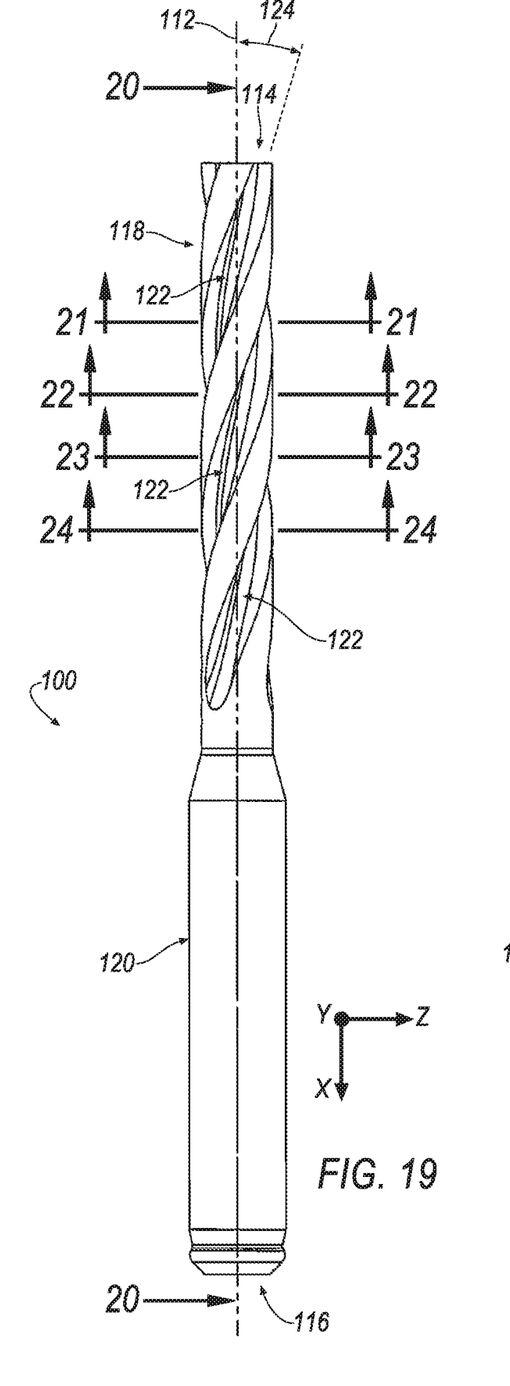
FIG. 19 is a side view of a rotary cutting tool, such as a modular drill, with three flutes according to another embodiment of the invention.
Figure 20:
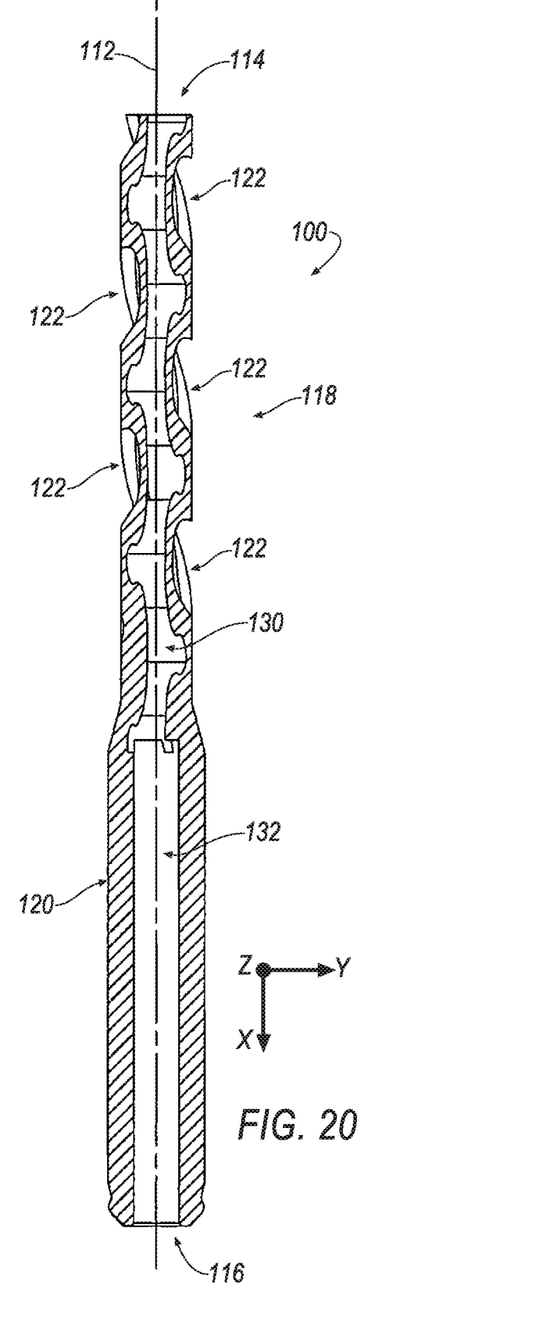
FIG. 20 is a cross-sectional view of the cutting tool of FIG. 19 taken along line 20-20 of FIG. 19.
Figure 21:
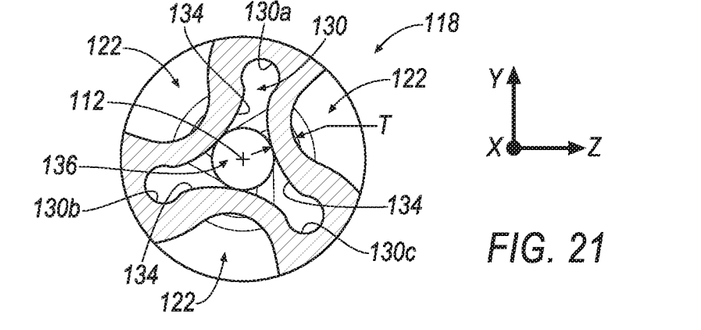
FIG. 21 is a cross-sectional view of the cutting tool of FIG. 19 taken along line 21-21 of FIG. 19.
Figure 22:
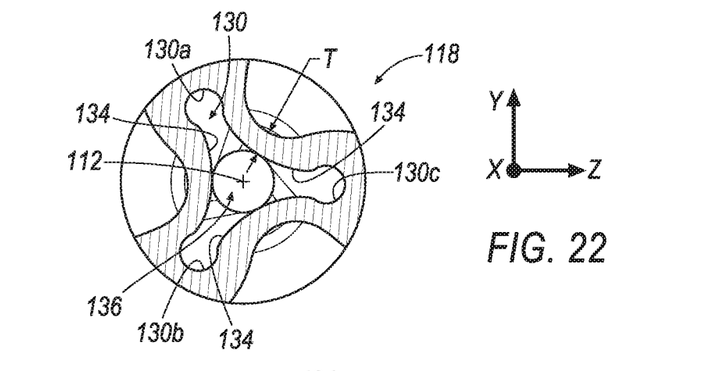
FIG. 22 is a cross-sectional view of the cutting tool of FIG. 19 taken along line 22-22 of FIG. 19.
Figure 23:
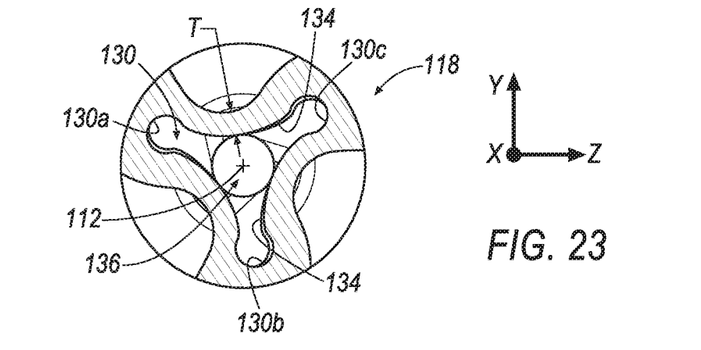
FIG. 23 is a cross-sectional view of the cutting tool of FIG. 19 taken along line 23-23 of FIG. 19.
Figure 24:
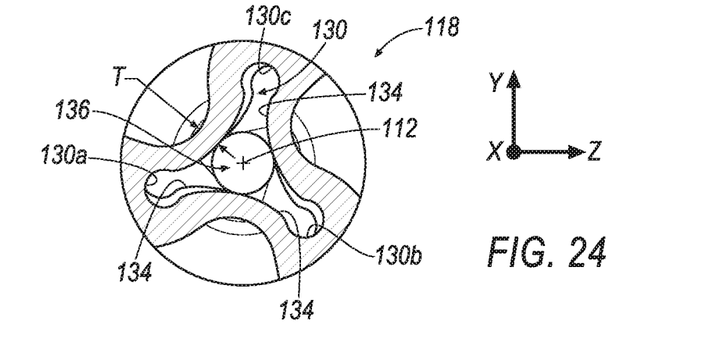
FIG. 24 is a cross-sectional view of the cutting tool of FIG. 19 taken along line 24-24 of FIG. 19.

FIGS. 19 and 20 depict a rotary cutting tool 100 for conducting cutting operations on a workpiece (not shown) when the rotary cutting tool 100 is rotated about a central, longitudinal axis 112 according to another exemplary embodiment of the invention.

The rotary cutting tool 100 is generally cylindrical and includes a first or forward end 114 and an opposite second rear end 116. The rotary cutting tool 100 further includes a chip flute portion 118 disposed at or about the first end 114 and a mounting portion 120 disposed at or about second end 116 for mounting the rotary cutting tool 100 in a chuck mechanism of a machine tool (not shown).

The chip flute portion 118 of the rotary cutting tool 100 further includes a plurality of helical flutes 122 extending rearwardly from the first end 114 of the chip flute portion 118 to the mounting portion 120. Each flute 122 allows chips formed by the rotary cutting tool 100 to exit from the chip flute portion 118 during a cutting operation. Each flute 122 is disposed generally at a helix angle 124 relative to the central, longitudinal axis 112. In one embodiment, for example, the helix angle 124 is at or about 30 degrees (+/−2 degrees). However, it will be appreciated that the invention is not limited by the magnitude of the helix angle 124, and that the invention can be practiced with any desirable helix angle 124 in a range between about greater than 0 degrees and about 75 degrees.

As seen in FIG. 20, the rotary cutting tool 100 further includes a first internal coolant passage 130 from the first end 114 and extending entirely through the chip flute portion 118 to the mounting portion 120 of the rotary cutting tool 100. In addition, the rotary cutting tool 100 further includes a second internal coolant passage 132 from the second end 16 and extending entirely through the mounting portion 120 to the chip flute portion 118 of the rotary cutting tool 100. In other words, the first and second coolant passages 130, 132 extend entirely through the rotary cutting tool 100.

In the illustrated embodiment, the second coolant passage 132 is generally circular in cross-sectional shape and can be in fluid communication with a pressurized coolant source (not shown). Coolant supplied to the rotary cutting tool 100 enters the second coolant passage 132, then enters the first coolant passage 130, and then exits the first end 114 of the rotary cutting tool 100. Although not shown in FIGS. 19 and 20, one or more cutting inserts 50 (shown in FIGS. 1 and 2) can be mounted to the first end 114 of the rotary cutting tool 100 and can be in fluid communication with the first coolant passage 130 for providing coolant to the cutting edges of the cutting insert 50.

Similar to the first coolant passage 30, the first coolant passage 130 has a "see-through", twisted/helical/spiral geometry that increases coolant flow area, while maintaining stiffness and rigidity of the cutting tool. As a result, the flow rate of coolant through the rotary cutting tool 100 is significantly increased, as compared to conventional cutting tools having a coolant passage with a circular cross-section. In some embodiments, the "see-through", twisted/helical/spiral geometry increases the flow rate by at least a factor of three, as compared to coolant flow rates in conventional cutting tools.

Referring now to FIGS. 21-24, the first coolant passage 130 has a polygonal cross-sectional shape with the same number, n, of side walls as the number of flutes 122. In the illustrated embodiment, the first coolant passage 130 is generally an elongated polygon with three rounded cusps 130a, 130b, 130c located between adjacent flutes 122 and having three substantially curved side walls 134. In other words, the first coolant passage 130 is generally a deltoid in cross-sectional shape. It should be noted that the invention can be practiced with non-rounded cusps, such as pointed cusps.

Similar to the first coolant passage 30, the first coolant passage 130 has a "see-through" central portion 136 extending along the central, longitudinal axis 112 of the rotary cutting tool 10. The "see-through" central portion 136 allows a direct line of sight through the entire chip flute portion 118 of the rotary cutting tool 100 when viewed from the first or second ends 114, 116 and directly aligned with the central, longitudinal axis 112. As can be realized the "see-through" central portion 136 provides a continuous and uninterrupted path for the flow of coolant directly through the rotary cutting tool 100. As can be seen in FIGS. 21-24, the first coolant passage 130 provides an increased flow area for the coolant, while maintaining a constant thickness, T, between the first coolant passage 130 and a respective flute 122, as compared to a conventional cutting tool with circular coolant passages. As a result, the first coolant passage 130 greatly increases the flow rate of coolant provided by the rotary cutting tool 100 without compromising stiffness and rigidity of the rotary cutting tool 100. This aspect of the invention is particularly useful for cutting tools having a small diameter (i.e., a cutting diameter of 6 mm or less).

As seen in FIGS. 21-24, the first coolant passage 130 rotates in the same direction as the helical flutes 122 along the central, longitudinal axis 112. In other words, the first coolant passage 130 has a helical, spiral or twisted geometry. In the illustrated embodiment, for example, the first coolant passage 130 rotates to the left along the central, longitudinal axis 112. It should be noted that the first coolant passage 130 can rotate to the right for a rotary cutting tool having opposite-handed flutes 122. It should also be noted that the invention can be practiced with a rotary cutting tool having straight flutes. In this case, the first coolant passage 130 would not rotate and follow the straight geometry of the flutes 122.

Figure 25:
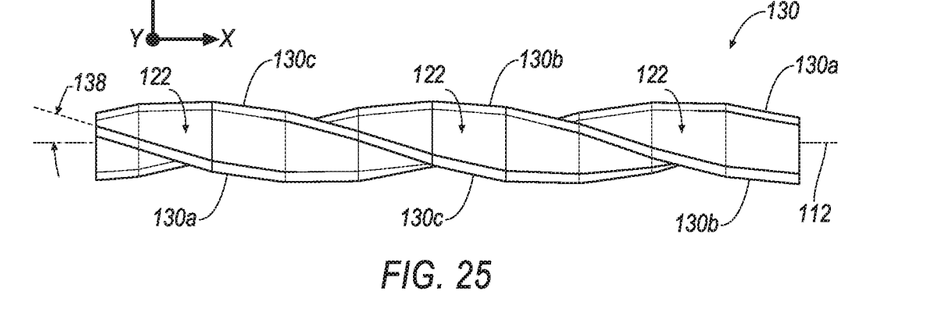
FIG. 25 is a side view of a solid rendering of the first coolant passage showing the helical geometry of the first coolant passage.
Figure 26:
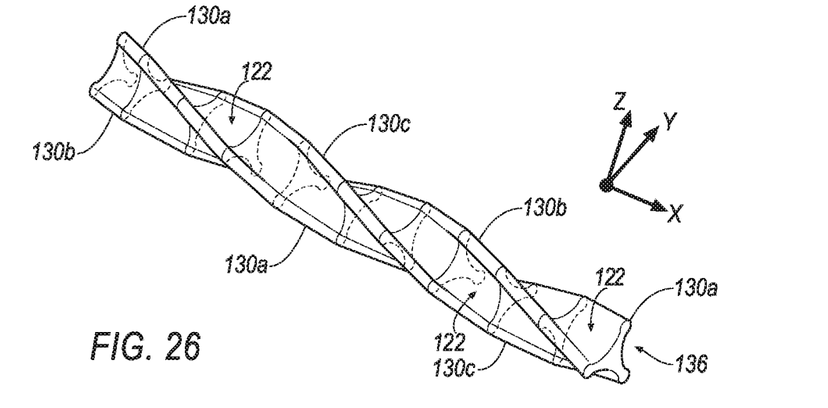
FIG. 26 is a perspective view of the solid rendering of the first coolant passage of FIG. 25 showing the helical geometry of the first coolant passage.
Figure 27:
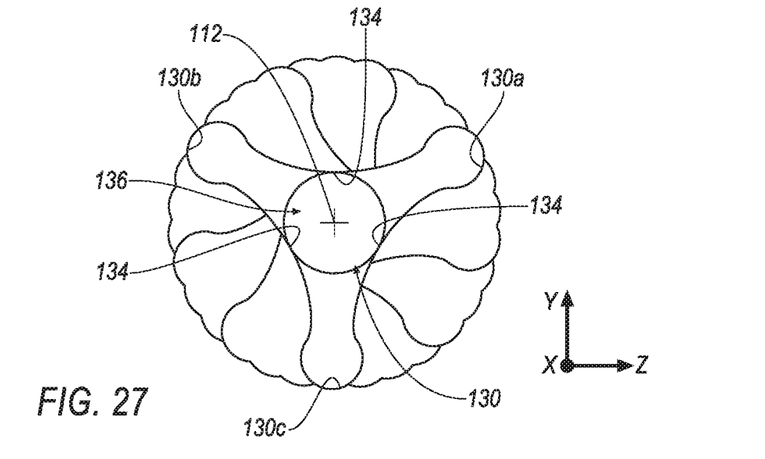
FIG. 27 is an end view of the solid rendering of the first coolant passage of FIG. 25 showing the helical/twisting geometry of the first coolant passage.

FIGS. 25-27 show a solid rendering of the first coolant passage 130 of the chip flute portion 118 of the rotary cutting tool 100. As shown in FIG. 25, each cusp 130a-130c of the first coolant passage 130 is disposed at a helix angle 138 with respect to the central, longitudinal axis 112 of the rotary cutting tool 100. In one embodiment, the helix angle 138 of the first coolant passage 130 is at or about the same angle as the helix angle 124 of the flutes 122. Thus, the first coolant passage 130 is twisted or helical that follows the same geometry as the flutes 122. It is to be readily appreciated that such an arrangement provides for the first coolant passage 130 to extend generally parallel alongside a respective flute 128 and maintain the thickness, T, between the first coolant passage 130 and the respective flute 128 along the entire chip flute portion 118 (FIGS. 21-24). As a result, the coolant flow rate is increased, while maintaining the stiffness and rigidity of the cutting tool 100.

Figure 28:
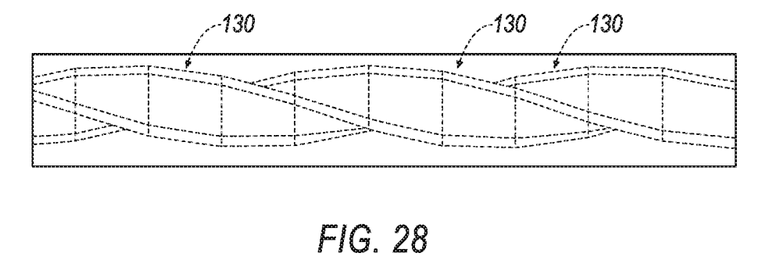
FIG. 28 is a side view of a solid rendering of a simple cylinder with the first coolant passage formed by subtracting the solid rendering of FIGS. 25-27 showing a "see-through" central portion of the helical first coolant passage.
Figure 29:
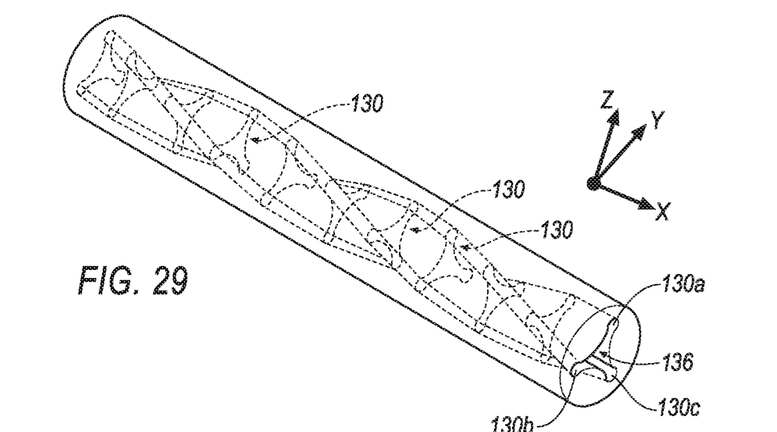
FIG. 29 is a perspective view of the solid rendering of the first coolant passage of FIG. 28 showing a "see-through" central portion of the helical first coolant passage.
Figure 30:
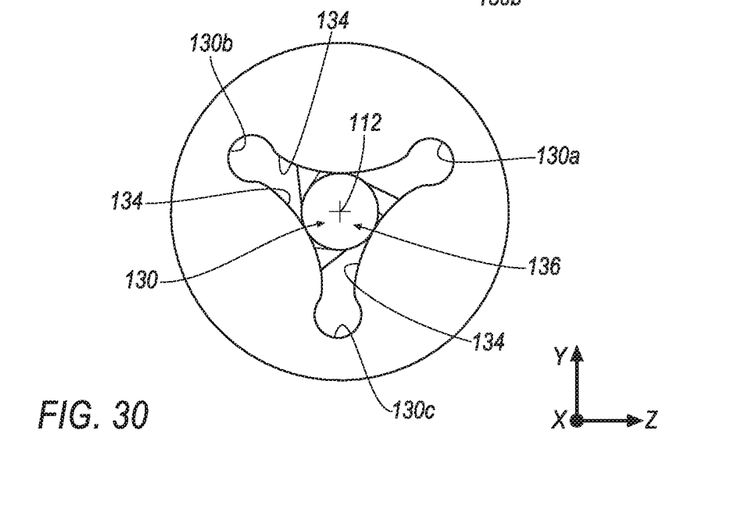
FIG. 30 is an end view of the solid rendering of the first coolant passage of FIG. 28 showing the "see-through" central portion of the first coolant passage.

FIGS. 28-30 show a solid rendering of a simple cylinder with the first coolant passage 310 formed by subtracting the twisted solid rendering of FIGS. 25-27. As shown in FIGS. 28-30 the helical first coolant passage 130 has a "see-through" central portion 136.

As described above, the inventive idea presented here is an innovative design that can significantly increase the coolant flow through the cutting tool, while reducing manufacturing costs. This is achieved by enlarging the conventional circular cross-sectional shape with a polygonal (i.e., non-circular) geometric cross-sectional shape that greatly increases the cross-sectional area, thereby significantly increasing the flow rate through the cutting tool 10, 100. In addition, the first coolant passage 30, 130 rotates to follow the surface of the flutes, thereby maintaining a constant thickness, T, between the first coolant passage 30, 130 and the flutes. As a result, the cutting tool 10, 100 has maintained its stiffness and rigidity, even though the cross-sectional flow area through the cutting tool 10, 100 has been greatly increased. Further, the first coolant passage 30, 130 has a "see-through" portion 36, 136 that is a continuous, unobstructed line of sight through the entire chip flute portion of the cutting tool 10, 100. As the result, the de-powdering process of the cutting tool and first coolant passage when formed by using additive manufacturing (i.e., 3D printing) is greatly improved by increasing the efficiency of powder removal after 3D printing and reducing the cost of the manufacturing process.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutting insert;
   a tool body including a pocket portion for holding the cutting insert and a chip flute portion having a plurality of helical chip flutes; and
   a first internal coolant passage formed in the chip flute portion, wherein the first internal coolant passage has a twisted geometry and has a central longitudinal axis which lies within the first internal coolant passage and which is generally collinear with the central longitudinal axis of the rotary cutting tool,
   wherein the first internal coolant passage is generally rectangular with two rounded end cusps and two substantially planar side walls,
   wherein the first internal coolant passage further includes a see-through central portion which defines an unobstructed linear coolant path when viewed from the first end of the cutting tool along the central longitudinal axis of the rotary cutting tool, and
   wherein the cutting insert includes a base surface with a coolant opening in fluid communication with the first internal coolant passage, and wherein the coolant opening has a substantially identical cross-sectional shape as the first internal coolant channel.

2. The rotary cutting tool of claim 1, further comprising a second internal coolant passage in fluid communication with the first internal coolant passage for supplying coolant to the first internal coolant passage.

3. The rotary cutting tool of claim 2, wherein the second internal coolant passage has a different cross-sectional shape than the first internal coolant passage.

4. The rotary cutting tool of claim 1, wherein the first internal coolant passage is formed by additive manufacturing.

5. The rotary cutting tool of claim 1, wherein the rotary cutting tool comprises a modular drill.

6. The rotary cutting tool of claim 1, wherein the cutting insert further includes a non-metal pad around a perimeter of one of the base surface and the coolant opening.

7. The rotary cutting tool of claim 1, wherein a thickness, T, between the see-through central portion and a respective flute remains substantially constant along the chip flute portion.

8. A tool body for a rotary cutting tool, comprising:
   a pocket portion for holding a cutting insert and a chip flute portion having a plurality of helical chip flutes; and
   a first internal coolant passage formed in the chip flute portion,
   wherein the first internal coolant passage has a see-through central portion which defines an unobstructed linear coolant path when viewed from the first end of the cutting tool along the central longitudinal axis of the rotary cutting tool and a twisted geometry and has a central longitudinal axis which lies within the first internal coolant passage and which is generally collinear with the central longitudinal axis of the rotary cutting tool;
   wherein the first internal coolant passage is generally rectangular with two rounded end cusps and two substantially planar side walls; and
   wherein the cutting insert includes a base surface with a coolant opening in fluid communication with the first internal coolant passage, and wherein the coolant opening has a substantially identical cross-sectional shape as the first internal coolant passage.

9. The tool body of claim wherein the first internal coolant passage is formed by additive manufacturing.

10. The tool body of claim 8, wherein a thickness, T, between the see-through central portion and a respective flute remains substantially constant along the chip flute portion.

11. A method of providing coolant in a rotary cutting tool having a central longitudinal axis, a tool body including a pocket portion for holding a cutting insert, a chip flute portion having a plurality of flutes and a first internal coolant passage, the method comprising:
   forming the first internal coolant passage in the chip flute portion such that the first internal coolant passage has a twisted geometry and has a see-through central portion which defines an unobstructed linear coolant path when viewed from the first end of the cutting tool along the central longitudinal axis of the rotary cutting tool,
   wherein the first internal coolant passage is generally rectangular with two rounded end cusps and two substantially planar side walls, and
   wherein the cutting insert includes a base surface with a coolant opening in fluid communication with the first internal coolant passage, and wherein the coolant opening has a substantially identical cross-sectional shape as the first internal coolant passage.

12. The method of claim 11, wherein the internal coolant passage is formed by additive manufacturing.

13. The method of claim 11, wherein a thickness, T, between the see-through central portion and a respective flute remains substantially constant along the chip flute portion.

* * * * *